United States Patent Office

Re. 26,969
Reissued Oct. 20, 1970

26,969
METAL CASTING PROCESS

Patrick J. O'Shea, Hazel Crest, Ill., assignor to Nalco Chemical Company, Chicago, Ill., a corporation of Delaware No Drawing. Original No. 3,184,813, dated May 25, 1965, Ser. No. 322,049, Nov. 7, 1963. Application for reissue May 5, 1969, Ser. No. 322,049
Int. Cl. B22c *3/00*
U.S. Cl. 164—72 14 Claims

Matter enclosed in heavy brackets [ ] appears in the original patent but forms no part of this reissue specification; matter printed in italics indicates the additions made by reissue.

*ABSTRACT OF THE DISCLOSURE*

*The base member or stool of a metal mold used to cast ingots is coated with a coating comprising a refractory material suspended in a binder from the group consisting of a coloidal silica sol, aluminum phosphate and ethyl silicate. The refractory material can be crystalline silica, aluminum silicate, alumina graphite, zirconium silicate, magnesium silicate or clay. The coating composition can also contain a polyhydroxy, water compatible organic compound in which case the refractory can also be vitreous or fused silica.*

This application is a continuation-in-part of my copending application, Ser. No. 273,297, filed Apr. 16, 1963, now abandoned.

The instant invention relates to an improved metal casting process. More specifically, the present invention is concerned with a method of increasing the life of mold bottoms, used to cast ingots, and prevent adherence of these mold bases to subsequently formed solidified ingots which must be removed from within the mold walls.

All metal ingots are cast from molds. One popular type is a "big end down" mold. These molds rest on bases commonly known as "stools." The stools are merely large, normally rectangular, flat slabs of metal, commonly made of cast iron, which are used as support for the mold sides and also, of course, form the bottom portion of the mold. The mold sides generally taper up in diameter from bottom to top. Another type of mold is known as the "big end up" mold. These are ladle-like receivers for the molten metal, the bottom portion of which molds are integral, non-removable parts of the entire mold.

Various problems commonly occur in use of these molds and particularly with respect to the surface of their base portions. First, the unprotected metal surface quickly erodes and pits in the presence of molten metals which are cascaded upon their surface. Large gouges in the base portions are produced due to the force and high temperature developed by the flowing molten metal which contacts the surface of the stool. Since many molds are generally approximately 5–10 feet in height, the metal must be poured from a height at least equal to that distance and quite often is poured from even greater heights. A considerable pressure head is thereby developed. Thus, the hot molten metal easily gouges gaping depressions in the base members under such force and at a temperature of at least the liquefaction temperature of the molten metal. Moreover, the problem of creation of pits or gouges in the base portions of the molds, caused by the above factors is aggravated due to the fact that the molten metal, especially near the bottom of the mold, remains in its erosive hot liquid states for a considerable amount of time subsequent to pouring.

The molten metal upon solidification to an ingot thereby has a bottom form conforming to the undesirable eroded surface configuration of the stool or base member of the mold. Thus, a considerable amount of the ingot, when withdrawn from the mold and subsequently processed into slabs or blooms, is lost through a cropping of the irregularly formed end of the slab. This, of course, is highly undesirable, since it results in undue loss of usable metal and increase in scrap, which must be subsequently reprocessed.

Another extremely serious and costly problem results after the ingot in the mold has solidified to a point where it can be removed from both the mold sides and its base platform member or stool. In many cases, if the surface of the stool is unprotected, or inadequately protected, and erosion occurs as described above, the ingot has a greater tendency to remain tightly adherent to the stool. Thus, after the mold sides are removed from around the ingot, which process can normally be efficiently achieved with a minimal film of coating selected from a variety of coating agents, the ingot must be forcibly removed from the stool. This is normally achieved by raising both ingot and adherent stool, and thrusting them against some other larger object whereby the ingot is jarred loose. In many cases the stool and ingot are merely dropped on the floor from some suitable height. In such a situation, the stool is often broken into two or more smaller pieces and cannot be subsequently reused in casting other ingots. Again, replacement cost of these stools is high, making this aspect of the overall casting process somewhat disadvantageous. The same problem exists with respect to bing end up molds wherein sticking of ingots particularly occurs at their base portion. New molds of this type are especially vulnerable to sticking due to their smooth surface unprotected by any layers of metal oxides or scale. A tight metal-to-metal bond between mold bottoms and ingots then occurs.

Cracking of molds and particularly their base portions due to the above discussed rough handling occasioned by "stickers" between the base portions and ingots is also enhanced by thermal shock during ingot formation. Unprotected or indaequately protected bottom surfaces of mold are especially susceptible to such destructive shock.

Many prior art coating materials have failed to give adequate protection to the mold base members, and in some cases caused ancillary process difficulties. For example, some inferior coatings were washed off the surface of the base portion of te mold and were thereby included as an unwanted impurity in the ingots. Such inclusions oftentimes deleteriously affected desirable metal properties.

The above described problem is a particularly arduous one, which prior art coating materials have not been able to cope with to any substantial degree. It would therefore be of benefit to the art if a method were discovered whereby the surfaces of the above described stools of big end down molds or base members of big end up molds, could be protected from erosion from cascading molten metal. If such erosion could be substantially prevented and, in addition, the problem of adherence between the base member and subsequently formed ingot could also be overcome, considerable advantages would accrue. For example, the overall casting process would be materially benefitted since the separation between the mold base member and ingot would be accomplished in a more facile operation.

It therefore becomes an object of the invention to provide a method of casting metal ingots into metal molds whereby adherence of the base member of the mold to the formed ingot and erosion of the same base member during ingot formation are substantially prevented.

A specific object of the invention is to inhibit such erosion and adherence by applying a film of coating material to the surface of the base member whereby these problems are overcome.

Yet another object is to provide improved metal molds used for casting metal ingots which have at least the base member of the mold protected by a film of material so that the above described problems of erosion of the base member and adherence of same to metal ingots no longer extst to any appreciable degree.

Other objects will appear hereinafter.

In accordance with the invention a method of casting metal objects from metal molds has been discovered, whereby adherence of the base member of those molds to ingots formed therefrom, and erosion of these same base members during such ingot formation are substantially inhibited.

In its broadest aspects, the invention comprises the steps of applying a slurry consisting of a binder and refractory to the surface of the base member of a metal mold. In order to best achieve dual purposes of prevention of erosion of base member and non-adherence to formed ingots, the slurry should consist of at least one refractory of the following types: vitreous silica, crystalline silica, magnesium silicate, aluminum silicate, alumina, graphite, zirconium silicate and clay. These materials are all well-known substances and are all commercially available. Typical aluminum silicates, for example, may include mica, a laminated type of aluminum silicate and mullite, an orthorhombic aluminum silicate available from the Island of Mull or artificially made by heating andalusite, sillimanite or cyanite. Excellent magnesium silicates are forsterite or talc, while a useful zirconium silicate is zircon. A typical crystalline silica is quartz. The most preferred refractory, discussed in more detail hereinafter, is vitreous silica. The binder used with any one or more of the above refractories may be colloidal silicia sol, aluminum phosphate or ethyl silicate. Mixtures of these binders may also be employed. The most preferred suspending medium for the above refractories is colloidal silica sol, which also will be discussed more exhaustively in a later section.

The slurry is provided in an amount adequate to form a coating of sufficient thickness to prevent the above mentioned adherence and erosion from occurring. After the slurry is allowed to dry with or without application of heat, whereby the liquid phase is driven from the surface of the base member, leaving a thin film of solid refractory coating, the molten metal is thereafter poured into the mold and on top of the now coated base member. The liquid metal is allowed to solidify into an ingot and then removed from the coated base member and mold sides.

The slurry coating reagent is simply applied to the stool or bottom of the mold by a wide variety of methods. For example, the slurry may be applied by flowing it over the stool, by spray techniques, by coating the stool with some type of applicator, etc. Spray application is believed to be the most efficient and practical way of slurry application. The slurry is best applied to the stool portion of big end down molds before the metal mold sides are placed thereon.

Effecting removal of the liquid phase of the slurry from the solid refractory material may likewise be carried out in a variety of methods. For example, the bottom portion of the mold may be coated with the slurry and allowed to dry gradually. Another method of laying down a thin protective coating is to apply the slurry to an already heated stool or mold having an integral base portion. This is particularly preferred in that the stools and their metal mold sides or big end up molds are generally already hot before introduction of the molten metal due to the residual heat from the previous casting run, and in such a method drying time is a very minimum period.

Another way of applying the protective film is to coat the base member, and then heat it as slowly or rapidly as desired to drive off the liquid portion of the slurry. In any event all that is necessary is that the coating be laid down in some manner after contact of the base member with the slurry.

In the most preferred method the coating slurry is applied to stools or mold base members having a temperature ranging from that of room temperature to 1,000° F., and more preferably from 200° F. to 800° F. Best adherence of solid coating to stools is achieved by slurry application to the stools at a temperature range of 200–500° F. For best results, it has been determined that films should measure in thickness from 0.01″ to 3″ and most preferably from 0.01″ to ⅛″.

It is believed that the excellent coating success achieved by use of the above described slurries is their ability to form a strong ceramic coating even when affixed to the base members of the mold at relatively low temperatures, at least under foundry conditions, of say about 500° F. or even lower. The coating becomes completely resistant to subsequent contact with water and stays tightly adherent to the base portions of the mold even under such washings.

After the coating has been formed preparation for casting is complete except when big end down molds are used. In those cases the mold sides should be placed on the base member following coating, if not already present during coating.

After coating operations, molten metal is flowed into the mold, allowed to solidify into an ingot and the ingot is then separated from mold surfaces. The invention is not limited to use with specific mold sides or any particular metal mold bottom or to use with any particular molten metal. However, it has been found specially preferred use in coating cast iron metal base members for molds which are used in forming ingots of steel.

The most preferred binder used to form the slurries of the invention is a colloidal silica sol. These are well-known materials and are commercially available from several sources of supply. A typical group of commercially available silica sols that may be used in the practices of the invention are those silica sols sold under the name "Nalcoag." Silica sols of this type are described below in Table I.

TABLE I

| Silica sol | I | II | III | IV | V | VI |
|---|---|---|---|---|---|---|
| Percent colloidal silica as $SiO_2$ | 15 | 30 | 35–36 | 21–22 | 49–50 | 35 |
| pH | 8.6 | 10.2 | 8.6 | 3.7 | 9.0 | 3.5 |
| Viscosity at 77° F., cps | <5 | <5 | <5 | <10 | 20–30 | 6.5 |
| Specific gravity at 68° F | 1.09 | 1.205 | 1.255 | 1.06 | 1.385 | 1.255 |
| Average surface area, m.² per gram of $SiO_2$ | 330–430 | 190–270 | 135–190 | 135–190 | 120–150 | 135–190 |
| Average particle size, millimicrons | 7.9 | 11–16 | 16–22 | 16–22 | 20–25 | 16–22 |
| Density, lbs./gallon at 68° F | 9.1 | 10.0 | 10.5 | 8.8 | 11.6 | 10.5 |
| $Na_2O$, percent | 0.04 | 0.40 | 0.10 | 0.05 | 0.30 | 0.01 |

Other silica sols that may be used in addition to those above, may be prepared by using several well-known conventional techniques. In a preferred practice of the invention the silica sols are treated with a suitable base either at the time of manufacture, or just prior to use, to provide a pH of at least 11.0 and most preferably at least 11.5. These alkaline sols tends to promote adherence of the coating to the stools. Perhaps, the most convenient method of making aqueous colloidal silica sols is described in Bird, U.S. Patent 2,224,325, wherein a dilute solution of an alkali metal silicate is passed in contact with a cation exchange resin in hydrogen form, whereby the silicate is converted to a dilute aqueous colloidal silica sol. The dilute sol may be concentrated to solids concentrations which are more economically usable from the standpoint of shipping costs and ultimate process use, by employing the techniques described in either Bechtold et al. U.S. Patent 2,574,902; Broge et al., U.S. Patent 2,680,721; or Alexander et al. U.S. Patent 2,601,235. Another type of silica sol which may be used in the practices of the invention is described in the specification of Reuter, U.S. Patent 2,856,302. While aqueous colloidal silica sols may be used, it will be understood that other forms of colloidal silica may be employed, such as for instance, sols which contain a major portion of polar organic solvents. Said sols may be generically referred to as organo sols, and are typified by the sols described in Marshall U.S. Patent 2,386,247. It is only necessary that the silica particles used can be dispersed colloidally in a hydrophilic substance, such as water or lower alkyl alcohols and other organic compounds possessing relatively high dielectric constants.

In some instances mixtures of water and organic substances compatible with water may be employed as suspending media for the colloidal silica particles. Particularly preferred organic substances are those which lower the freezing point of pure aqueous sols by their admixture with these aqueous silica sols. Such final product sols then are especially useful during the colder months of the year when they must be stored and/or used at relatively low temperature. Amines such as morpholine, diethylamine, etc., and polyhydroxy organics as ethylene glycol, glycerine etc., are preferred materials in making up silica sols containing these substances as sole silica suspending media or as a portion of a mixture additionally containing water. A prefererd sol, "winterized" against freezing contains 5–50 parts by weight of polyhydroxy compound such as ethylene glycol, 20–85 parts by weight of water and 10–60 parts by weight of silica.

Regardless of the method employed to produce the colloidal silica sol containing water, polar organic liquids or mixtures of these substances as a continuous suspending phase, it is desirable that said sols contain silica particles which are dense, amorphous, and have an average particle diameter which does not exceed 150 millimicrons. As evidenced by a reading of Table I, all the silica sols contemplated as starting materials have an average particle size diameter well below 150 millimicrons. Preferably, the starting silica sols have an average particle size diameter of from 10–50 millimicrons. The silica concentration in the sols may be between 0.1% and 60% by weight silica expressed as $SiO_2$. More preferred sols contain from 3.0 to 60% by weight of silica and most preferably 10–60% by weight.

Other sols which may be employed as binders for the silica refractory are those known as "salt-free" silica sols. These are particularly preferred when the suspension media of the silica particles in the binder itself is solely a polar organic liquid or a mixture of water and polar organic liquid. Since many of the above described sols usually contain alkali metal compounds as stabilizers, they are generally not compatible with organic systems due to the fact that the salts present in the aqueous sol cause gelation or precipitation of the silica particles when the aqueous phases are exchanged for polar organic solvents. This can be avoided by use of "salt-free" aqueous silica sols as starting materials in preparation of pure organo sols or mixture of water and organic as silica carriers. In order to avoid this gelation effect, it is necessary that the causative cations be removed from the surface of the colloidally dispersed silica particles and from the liquid phase of the sol. This may be readily accomplished by treating typical silica sols of the type described in Bechtold et al., U.P. Patent 2,547,902, with a cation exchange resin in the hydrogen form and a strong base anion exchange resin in hydroxide form. This treatment tends to produce a finished aqueous sol in which both the continuous aqueous phase of the sol and the particles of silica are considered "salt-free." Typical commercially available silica sols which may be deionized to produce "salt-free" silica sols are those which are described in Table I above. These aqueous "salt-free" silica sols may be either used as such in combination with one or more of the named refractories to constitute a slurry coating material or may be modified whereby the aqueous phase is completely or partially exchanged for a hydrophilic polar liquid such as an alcohol or the alcohol is mixed with aqueous sol in desired proportions. The "salt-free" pure alcohols or aqueous-alcoholic silica sols may then be easily combined with a refractory and the resultant slurry used to coat the stools.

When the particle sizes of the silica sols described above are within the ranges specified, the silica particles present in the starting aqueous or organic sol have specific surface areas of at least 20 $m.^2/g.$, and usually in excess of 100 $m.^2/g$. Further, when deionized sols are employed as a binder, they generally have a salt content expressed as $Na_2SO_4$, of less than 0.01%.

As mentioned above, the most preferred refractory materials are those generally referred to as vitreous silicas. These are glassy modifications of silica, obtained by the fusion of selected low temperature crystalline forms, and are frequently referred to as quartz glass or silica glass. Specific vitreous silicas include those particles made from fused quartz glasses, silicate glasses, silica glasses such as the well-known Vycor materials and fused silica glasses. With respect to all of these materials the thermal expansion coefficients are relatively small in proportion to other refractories such as those of the soda-lime and lead glass types. Generally, they have thermal expansion coefficients smaller than $5\times10^{-6}$ cm./cm./° C. Also, the silica content of these granular siliceous refractory materials is generally greater than 96% silica expressed as $SiO_2$ and may range as high as 99.8% $SiO_2$. Thus, by the term "vitreous silica" is meant a refractory comprising a silica glass having a thermal coefficient of expansion and $SiO_2$ content within the above range.

It has been determined that for best results in coating stools the refractory used in the silica slurry should be able to withstand severe heat shocks. Due to the extreme hot temperature of the molten metal as compared to that of the stool even when the latter is heated, an exceedingly abrupt change in temperature occurs when the metal contacts the stool. The coating must itself be able to withstand this heat shock to impart necessary protection to the stool base. It has been theorized that faiure of some prior art materials was due, at least in part, to their inability to withstand this sudden increase in heat, thereby resulting in cracking of the coating and subsequent exposure of the metal surface to the cascading molten metal poured into the mold.

In view of theabove it is generally though that the most preferred refractories are those which have the highest purities concomitant with the lowest thermal coefficient of expansion. These properties are particularly possessed by vitreous silicas and more particularly those of the fused silica types. The latter materials have a silica content greater than 97% silica expressed as $SiO_2$ and a thermal coefficient of expansion not greater than about $6\times10^{-7}$ cm./cm./° C.

A typical fused silica of the type described above which is extremely useful in the practice of the invention, having a thermal coefficient of expansion of about $5\times10^{-7}$ cm./cm./° C., has the following typical analysis:

TABLE II

| Ingredients: | Percent by weight |
|---|---|
| $SiO_2$ | 97.3 |
| $Al_2O_3$ | 1.7 |
| Sub-oxides of silica | 1.0 |

The above type silica products are readily prepared by grinding very pure fused silica glasses. Likewise, the boro-silicate glasses and Vycor silica glasses may be also ground to produce extremely useful refractories.

The particle size of the refractory may vary over a wide range. It is preferred, however, that the refractory particles be sufficiently small so that a uniform dispersion of refractory and binder may be made. The smaller the particle size the longer a slurry made up of binder and refractory, remains in a homogeneous state. It has been determined that particles ranging in size from 150 mesh to as low as a fraction of a micron may be employed. Preferred refractory materials have an average particle size ranging from 20 to 500 microns in particle diameter, with particles corresponding to the lower range diameters being most preferred. Specific vitreous silica substances, marketed under the name, "Nalcast" fall within the above preferred particle size range and have been employed with much success in preventing erosion of base portions of molds and adherence of same to the formed ingots.

The amount of binder making up a portion of the coating slurry must be such that it is present in an amount sufficient to bind the refractory particles together to thereby form a tightly adherent, continuous and unbroken coating which is securely bonded to the surface of the stool. Without proper amount of binder in relation to refractory, the resultant coating, after application and drying of slurry, exhibits a "pan-cake" effect with numerous undesirable holes appearing in the coating, thereby exposing portions of the stool or mold base surface. To achieve this, it has been determined that the slurry is preferably composed of from 10 to 70% by weight of refractory, and from 30 to 90% by weight of binder. Thus, another slurry which can be employed in the practice of the invention is one containing 10–70 parts by weight of alumina and 30–90 parts by weight of aluminum phosphate. Most preferably the slurry contains from 20 to 60% by weight of refractory and from 40 to 80% by weight of binder.

The following examples show typical ways of carrying out the aims of the invention. It is understood, of course, that these examples are merely illustrative, and that the invention is not limited thereto.

EXAMPLE I

Into a 65 gallon pressure tank were added 35 gallons of a 30% aqueous colloidal silica sol binder corresponding to Silica Sol No. II, whose physical characteristics are tabulated in Table I. To this was added 500 pounds of a fused silica refractory. This latter material has a wide range particle size distribution in which 100% will pass a 200 mesh sieve, 75% will pass 325 mesh, 30% is smaller than 10 microns and the smallest particles are a fraction of a micron in size. The refractory and binder were thoroughly mixed in order to form a silica coating slurry having a viscosity of 10–20 seconds using a No. 5 Zahn Cup.

The silica slurry was then sprayed onto a number of cast iron stools which were approximately 7 ft. x 4 ft. x 18 in. in dimension. The weight of each of these stools, which after coating acted as mold bottoms, was approximately 20,000 pounds. Approximately ¾ gallon of slurry was applied per stool. Since the stools, when coated, were at a temperature of approximately 300° F., the drying of the slurry and deposition of silica film occurred in a matter of a few seconds. After the film had been applied, open bottom-open top metal mold sides were placed thereon to constitute a big end down mold. These mold sides had approximate dimensions of 96" in height, and their sides measured 38" and 48" respectively. The entire mold was then sprayed with water in order to cool it sufficiently to allow personnel to also spray the walls of the mold with a carbonaceous coating or the same silica slurry used to coat the bottom of the mold or stool. At the same time the mold walls were cleaned of any adherent slag, metal, etc. After these operations were completed, the molten metal, in this case a low carbon steel made by the Basic Oxygen Process was poured from a 3" diameter hole in the bottom of a ladle.

In all cases the coating remained intact, even under the erosive process conditions of pouring of molten metal from a substantial height through an opening of relatively small diameter, which developed substantial head pressures of the relatively small diameter stream of metal. This, along with the extremely high temperature of metal melt had succeeded in breaking up or penetrating prior art protective coatings used in previous runs. These prior art coating materials had been almost completely ineffectual in combating the erosive effect of the falling molten metal. In all cases deep gouges had been made in the stools. Generally, a 12" depth of molten metal was formed over the coated stool before a metal skin formed. Thus, any gouges and pitting produced by the erosive falling effect of the molten metal would be greatly aggravated by the molten metal remaining in contact with the stool for a considerable length of time before solidification.

Morevore, in the instant experiments in no case did there appear any appreciable sign of erosion. Also, some of the stools could be reused in a number of runs before additional coating had to be applied. In addition, after the metal had solidified and the ingots were removed from the mold sides and stool, no "stickers" appeared. That is, there was substantially no adherence of the stool or mold base to newly solidified ingots, which could be easily removed with a minimum of process time. Also, since no erosion occurred, the amount of "butt" of the ingot was minimized, and the amount of scrap lost upon subsequently slabbing was substantially reduced. In other runs in which the fall of molten metal on the stool was from even greater heights than 7 ft., either there was no erosion or only minimal amounts of erosion occurred.

EXAMPLE II

In another series of runs, 13 stools of the type described above were coated with a master slurry consisting of 60 gallons of the same colloidal aqueous silica sol and fused silica refractory described in Example I. The coating was effected thorugh use of an air gun. The slurry was sprayed on to provide a coating of about 0.03" in thickness, with about 1.15 gallons of the viscous slurry being consumed per stool. The viscosity of the slurry as applied was measured at 15 seconds using a No. 5 Zahn Cup.

Results of the test are summarized below. In all instances no erosion of the stools was noted during ingot formation. Likewise, no "stickers" occurred during removal of the solidified ingot from the coated base member. The teeming or pouring temperature was 2920° F., with the stripping or ingot removal carried out approximately three hours after teeming. In all cases at least 85% of the coating of silica laid down on the stool was retained, thus allowing the coated stools to be employed in subsequent ingot formation runs without any additional coating, or with only minor amounts of recoating. Considerable savings are thereby effected, since undue amounts of slurry need not be consumed with each and every run of ingot formation. The less frequent applications of coating are a distinct advantage in the process.

Results of the various ingot formation runs are summarized below in Table III.

TABLE III

| Stool number | Erosion before pour, inches | Erosion after pour, inches | Coating retained, percent |
|---|---|---|---|
| 1 | 5.5 | 5.5 | 85 |
| 2 | 4.0 | 4.0 | 80 |
| 3 | .5 | .5 | 85 |
| 4 | 3.0 | 3.0 | 91 |
| 5 | 5.0 | 5.0 | 85 |
| 6 | 2.0 | 2.0 | 85 |
| 7 | 2.0 | 2.0 | 85 |
| 8 | 3.5 | 3.5 | 90 |
| 9 | 3.5 | 3.5 | 85 |
| 10 | 1.0 | 1.0 | 95 |
| 11 | 2.0 | 2.0 | 85 |
| 12 | .0 | .0 | 85 |
| 13 | 2.3 | 2.3 | 85 |

Likewise, adequate prevention of erosion of mold base members and sticking of same to ingots may be effected by employment of any of the other before-mentioned refractories or binders. These materials in slurry form may be applied as illustrated above with equally good results.

It can be seen from the above experiments that the overall objectives of substantially preventing erosion of stools or base members of metal molds during pouring of molten metal thereon, and prevention of adherence of the subsequently formed solidified ingot to the base member have been achieved to a substantial degree. In addition, subsidiary good effects are to be noted. For example, since erosion has been reduced to a minimal effect, life of mold bases is substantially increased. Likewise, since no adherence of the mold base portions to the ingots occurs, no resort need be taken to physically contacting the two adherent articles against a third larger object such as a floor, to separate the united objects and recover the ingot. As mentioned above, not only is this separation procedure time-consuming and costly, but it frequently results in cracking or complete disintegration of the mold, making it completely unsuitable for further use. Also, since little or no erosion occurs from the molten metal, the amount of butt required to be cropped from the ingot is substantially reduced. As an overall advantage, the mold inventory necessary for efficient operation may be substantially reduced through use of the slurries of the invention.

Other advantages are to be noted. For example, since semi-permanent coatings on stools may be maintained by formation of the coating film, more ductile stools may be utilized. Thus, lighter stools may be employed, cutting down on track weight and track maintenance, since stools are normally carried by means of flat cars on rails to the point of pouring of metal. Also, since the coating appears to withstand a wide range of temperature of molten metal, it is possible that severe temperature surface applications may be performed which were heretofore impossible due to failure of prior art coatings. Many other advantages of the mold forming process of the invention are apparent.

The invention is hereby claimed as follows:

1. A method of inhibiting erosion of the surface of the base member of a metal mold used to cast ingots, which erosion normally occurs during contact of said surface with flowing molten metal, while subsequently preventing adherence of said ingots to said base member upon ingot formation; which comprises the steps of applying to said surface a slurry comprising a refractory suspended in a binder, said slurry being applied in an amount sufficient to form a coating of sufficient thickness to inhibit said erosion and prevent said adherence and allowing said slurry to dry whereby a protective solid coating is formed upon said base member, said slurry comprising at least one refractory selected from the group consisting of [vitreous silica,] crystalline silica, aluminum silicate, alumina, graphite, zirconium silicate, magnesium silicate and clay suspended in at least one binder selected from the group consisting of a colloidal silica sol, aluminum phosphate and ethyl silicate, with said binder being present in an amount sufficient to bind the refractory particles together to thereby form a tightly adherent coating which is bonded to said surface.

2. The method of claim 1 wherein said base member is cast iron, and said ingots cast are composed of steel.

3. The method of claim 1 wherein said slurry comprises 10–70 parts by weight of [vitreous silica] *said refractory* and 30–90 parts by weight of silica sol binder.

4. The method of claim 3 wherein [said vitreous silica is fused silica which is characterized as having a silica content not less than 96% silica, expressed as $SiO_2$, and a thermal coefficient of expansion less than $5\times10^{-6}$ cm./cm./° C.; and] said binder is composed of 10–60% by weight of substantially discrete, dense, non-agglomerated particles of silica colloidally dispersed in an aqueous liquid.

5. The method of claim 1 wherein said slurry comprises 10–70 parts by weight of alumina and 30–90 parts by weight of aluminum phosphate.

6. In a method of casting metal ingots from a metal mold whereby adherence of the base member of said mold to said formed ingots and erosion of said base member during formation of said ingots are substantially prevented; which comprises the steps of applying to the surface of said base member, a slurry comprising at least one refractory selected from the group consisting of [vitreous silica,] crystalline silica, aluminum silicate, alumina, graphite, zirconium silicate, magnesium silicate and clay suspended in at least one binder selected from the group consisting of colloidal silica sol, aluminum phosphate and ethyl silicate, said slurry being applied in an amount adequate to form a solid coating of sufficient thickness to inhibit said erosion and prevent said adherence, allowing said slurry to dry whereby the liquid phase of said slurry is driven from the surface of said base member leaving a thin film of refractory, pouring molten metal into said mold, allowing said metal to solidify into an ingot, and removing said ingot from said coated base member in said mold, said binder being present in an amount sufficient to bind the refractory particles together to thereby form a tightly adherent coating which is bonded to said surface.

7. The method of claim 6 wherein said coated base member is composed of cast iron and said ingots are steel.

8. The method of claim 6 wherein said slurry comprises 10–70 parts by weight of [vitreous silica] *said refractory* and 30–90 parts by weight of a silica sol containing 3.0–60% by weight of silica colloidally dispersed in a hydrophilic continuous phase.

9. The method of claim 8 wherein [said vitreous silica is fused silica which has a silica content not less than 96% silica, expressed as $SiO_2$, and a thermal coefficient of expansion less than $5\times10^{-6}$ cm./cm./° C.; and] said binder is composed of 10–60% by weight of substantially discrete, dense, non-agglomerated particles of silica colloidally dispersed in an aqueous liquid.

10. The method of claim 6 wherein said slurry comprises 10–70 parts of [vitreous silica] *said refractory* and 30–90 parts by weight of a silica sol binder, said binder being composed of 5–50 parts by weight of a polyhydroxy water-compatible organic compound, 20–85 parts by weight of water and 10–60 parts by weight of colloidally dispersed silica.

11. An improved metal mold for casting metal ingots which comprises an open-top mold having at least its base member coated with a thin solid protective film of refractory material derived from drying a slurry comprising at least one refractory selected from the group consisting of [vitreous silica,] crystalline silica, aluminum silicate, alumina, graphite, zirconium silicate, magnesium silicate, and clay suspended in at least one binder selected from the group consisting of colloidal silica sol, aluminum phosphate and ethyl silicate, said binder being present in said slurry in an amount sufficient to bind the refractory materials together to thereby form a tightly adherent coating which is bonded to said base member, said coated base member being further characterized as being non-erosive to flowing molten metal and non-adherent to subsequently formed solid metal ingots.

12. The metal mold of claim 11 wherein said coating is derived from a slurry comprising 10–70 parts by weight of [vitreous silica having a silica content not less than 96% silica, expressed as $SiO_2$, and a thermal coefficient expansion of less than $5\times10^{-6}$ cm./cm./° C.;] *said refractory* and 30–90 parts by weight of a colloidal silica sol binder.

13. The method of claim 1, where the pH of the colloidal silica sol is at least 11.0.

*14. In a method of casting metal ingots from a metal mold whereby adherence of the base member of said mold to said formed ingots and erosion of said base member during formation of said ingots are substantially prevented; which comprises the steps of applying to the surface of said base member, a slurry comprising 10–70 parts of vitreous silica and 30–90 parts by weight of a silica sol binder, said binder being composed of 5–50 parts by weight of a polyhydroxy water compatible organic compound, 20–85 parts by weight of water and 10–60 parts by weight of colloidally dispersed silica, said slurry being applied in an amount adequate to form a solid coat-*

*ing of sufficient thickness to inhibit said erosion and prevent said adherence, allowing said slurry to dry whereby the liquid phase of said slurry is driven from the surface of said base member leaving a thin film of refractory, pouring molten metal into said mold, allowing said metal to solidify into an ingot, and removing said ingot from said coated base member in said mold, said binder being present in an amount sufficient to bind the refractory particles together to thereby form a tightly adherent coating which is bonded to said surface.*

References Cited

The following references, cited by the Examiner, are of record in the patented file of this patent or the original patent.

UNITED STATES PATENTS

| | | | |
|---|---|---|---|
| 2,623,809 | 12/1952 | Myers | 164—114 X |
| 2,948,032 | 8/1960 | Reuter | 164—26 |
| 3,059,296 | 10/1962 | North | 106—38.27 X |
| 3,077,413 | 2/1963 | Campbell | 164—41 X |

J. SPENCER OVERHOLSER, Primary Examiner

J. E. ROETHEL, Assistant Examiner

U.S. Cl. X.R.

164—14, 33, 138

Disclaimer

Re. 26,969.—*Patrick J. O'Shea*, Hazel Crest, Ill. METAL CASTING PROCESS. Patent dated Oct. 20, 1970. Disclaimer filed Jan. 11, 1971, by the assignee, *Nalco Chemical Company*.

Hereby enters this disclaimer to claim 14 of said patent.

[*Official Gazette May 25, 1971.*]